US011274216B1

(12) United States Patent
Shaban et al.

(10) Patent No.: US 11,274,216 B1
(45) Date of Patent: Mar. 15, 2022

(54) MARINE NATURAL PRODUCTS-BASED TIO$_2$ NANOPARTICLES AS ANTIFOULING AGENTS

(71) Applicant: King Abdulaziz University, Jeddah (SA)

(72) Inventors: Yasser A. Shaban, Jeddah (SA); Walied Mohamed Alarif, Jeddah (SA); Adnan Jaman Turki, Jeddah (SA); Mohamed Ali Ghandourah, Jeddah (SA); Hermine Ramzy Zaki, Alexandria (EG)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/158,049

(22) Filed: Jan. 26, 2021

(51) Int. Cl.
*C09D 5/16* (2006.01)
(52) U.S. Cl.
CPC .................................. *C09D 5/1618* (2013.01)
(58) Field of Classification Search
CPC .... C09D 5/1618; C09D 5/1625; A01N 65/00; A01N 65/03
See application file for complete search history.

(56) References Cited

FOREIGN PATENT DOCUMENTS

CN 107582422 A * 1/2018

OTHER PUBLICATIONS

Derwent-Acc-No. 2019-29093N, abstract of India Patent Specification No. IN 2017-11021884 A. (Year: 2019).*

* cited by examiner

*Primary Examiner* — Anthony J Green
(74) *Attorney, Agent, or Firm* — WC&F IP

(57) ABSTRACT

A method of synthesizing nanoparticles comprising TiO$_2$ and marine-based materials is provided. The method comprises mixing a solution containing a titanium precursor with a marine plant extract to form a colloidal suspension; aging the colloidal suspension to form a gel; drying the gel; and grinding the gel to obtain a powder comprising nanoparticles comprising TiO$_2$ and marine-based materials. Paint formulations comprising the nanoparticles and methods of using the same are also provided.

13 Claims, 12 Drawing Sheets

(11 of 12 Drawing Sheet(s) Filed in Color)

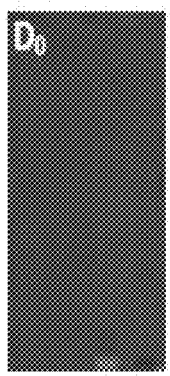 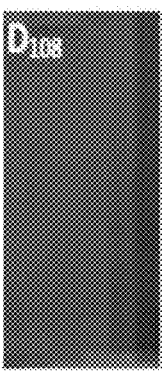 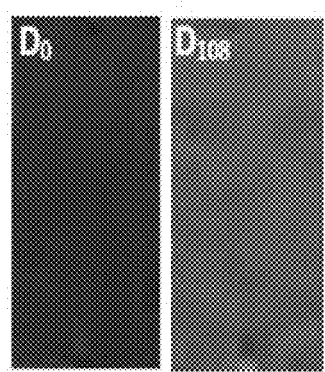 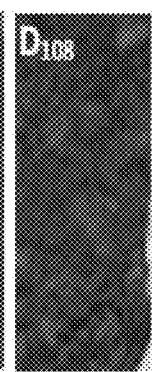
FIG. 8A    FIG. 8B        FIG. 8C    FIG. 8D        FIG. 8E    FIG. 8F Sesterterpenes Nucleic acid precursors mycosporine-like amino-acids and a betaine Amino acids: R= -CH$_2$OH, -CH(OH)CH$_3$, -CH$_2$SH, -CH$_2$CH$_2$SCH$_3$, -C$_6$H$_4$OH

MARINE NATURAL PRODUCTS-BASED TiO$_2$ NANOPARTICLES AS ANTIFOULING AGENTS

FIELD OF THE INVENTION

The invention is generally related to methods of synthesizing TiO$_2$ nanoparticles using marine natural extracts and antifouling formulations thereof.

BACKGROUND OF THE INVENTION

Fouling has significant economic influences on sea transportation and other submerged surfaces. The use of natural antifouling compounds is considered the most effective method to prevent bacterial attachment to submerged surfaces. Active antifouling agents are found in bacteria, algae, corals, sponges, seaweed and land plants (Almeida et al., 2007). A previous study reported the use of a dead form of tubeworms and sepia shell in two prepared marine paint formulations and found that tubeworms in both paint compositions gave higher steel surface protection from marine corrosion for 28 days of immersion, while the coated surfaces with paint containing *Sepia officinalis* shell incorporated with the second paint formulation showed the least fouled surfaces after 200 days of immersion in seawater (Tadros and Tadros, 2013). Another study utilized some marine algae and land plants: *Corallina mediterranea, Grateloupia filicina, Ulva lactuca*, Mangrove leaves (*Avecinia marina*) and Pepper (blackpepper seeds). Each one of them was incorporated solely by 10% concentration (w/w) with a prepared antifouling paint formulation and hanged in a steel frame, then immersed in the Eastern Harbour (E.H.) seawater. Their results showed that the unprimed coated steel panel including *Grateloupia filicina* exhibited the preferable outcomes pursued by *Corallina mediterranea* (Hamdona et al., 2019). Soliman et al. (2016) used three species of Red Sea cucumbers (*Holothuria atra* (a), *Holothuria atra* (b) and *Holothuria nobilis* (c) to apply their extracts as antifouling agents on PVC plates. Their immersion was in the E.H. of Alexandria, Egypt. The extract of *Holothuria atra* (b) species showed more antifouling activity than the other two species after 185 days of immersion. Seven marine algal species *Ulva lactuca, Ulva fasciata* and *Codium tomentosum*, Phaeophyceae; *Colpomenia sinuosa*, Rhodophyceae; *Pterocladia capillacea, Jania rubens* and *Corallina mediterranea* were incorporated solely in a prepared marine paint formulation. They were applied on wood panels and immersed in sterile glass beakers filled with seawater samples obtained from Alexandria (E.H.), Egypt. Their suppressive effect on slim film forming bacteria was studied. The tested *Ulva fasciata, Corallina mediterranea* and *Codium Tomentosum* showed the highest suppressive effect: 100, 99.6 and 99.5%, respectively (Ibrahim et al., 2019). Terpenes from soft corals introduce the prime protection chemically versus naturally significant predators (Roethle and Trauner, 2008).

Titanium oxide (TiO$_2$) has an excellent photocatalytic performance and chemical stability, besides its low cost and biological safety. For these reasons, TiO$_2$ has received special attention for its purification applications (Agrios and Pichat, 2005; Shaban and Orif, 2019; Shaban, 2019; Shaban and Fallata, 2019) and as an antimicrobial agent (Agrios and Pichat, 2005). Conventionally, titanium oxide nanoparticles were commonly synthesized by various physical and chemical techniques, such as solvothermal, reduction, non-sputtering, electrochemical and sol-gel methods. However, these technologies are associated with some limitations and drawbacks such as high cost, toxicity, and requirements of high energy and pressure (Sundrarajan and Gowri, 2011). Furthermore, a serious eco-toxicological concern has been created as a result of the utilization of hazardous chemicals and their release into the environment (Devatha et al, 2016). Therefore, the development of an efficient, viable, and environmentally safe process to conquer the drawbacks and to avoid adverse effects of the traditional methods is needed.

SUMMARY

Described herein are TiO$_2$ nanoparticles synthesized using plant phytochemicals. The eco-friendly approach described herein provides an effective anti-fouling agent while minimizing the environmental impact.

An aspect of the disclosure provides a method of synthesizing nanoparticles comprising TiO$_2$ and marine-based materials, comprising mixing a solution containing a titanium precursor with a marine plant extract to form a colloidal suspension; aging the colloidal suspension to form a gel; drying the gel; and grinding the gel to obtain a powder comprising nanoparticles comprising TiO$_2$ and marine-based materials.

In some embodiments, the titanium precursor is titanium (IV) butoxide. In some embodiments, the marine plant extract is obtained from a red algae. In some embodiments, the marine plant extract is obtained from *Bostrychia tenella*. In some embodiments, the marine plant extract is obtained from a red sea sponge. In some embodiments, the marine plant extract is obtained from *Carteriospongia foliascens*. In some embodiments, the solution comprises ethanol. In some embodiments, the method further comprises a step of calcinating the nanoparticles.

Another aspect of the disclosure provides nanoparticles comprising TiO$_2$ and marine-based materials produced by a method as described herein.

Another aspect of the disclosure provides a paint formulation comprising nanoparticles as described herein and a volatile solvent. In some embodiments, the volatile solvent is xylene.

Another aspect of the disclosure provides a method of protecting a surface from fouling agents, comprising contacting the surface with nanoparticles as described herein. In some embodiments, the nanoparticles comprising TiO$_2$ and marine-based materials are suspended in a volatile solvent as a paint formulation. In some embodiments, the surface is an exterior surface of a boat, ship, or other waterborne vessel.

BRIEF DESCRIPTION OF THE DRAWINGS

The patent or application file contains at least one drawing executed in color.

Copies of this patent or patent application publication with color drawings will be provided by the Office upon request and payment of the necessary fee.

FIGS. 8A-F. Photographic pictures of the coated panels with: (A) BTP at day 0, (B) BTP at day 108, (C) CTP at day 0, (D) CTP at day 108, (E) commercial paint at day 0, and (F) commercial paint at day 108.

DETAILED DESCRIPTION

Figure 1:
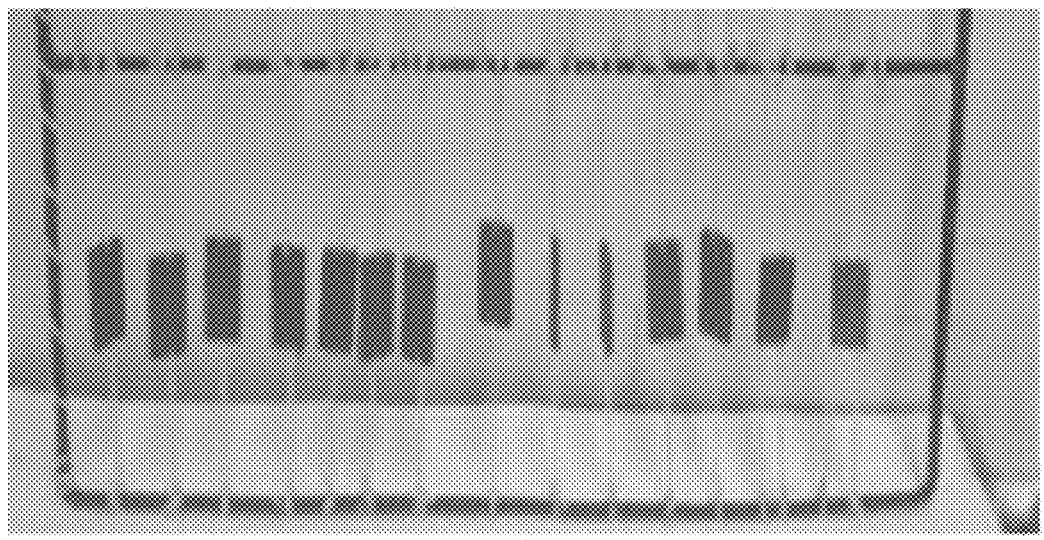
FIG. 1. Photograph of coated wood panels with the prepared marine paint formulations before immersion.

Embodiments of the disclosure provide environmentally benign titanium oxide nanoparticles as antifouling agents which are useful for application to marine vessels and submerged infrastructures.

A sol-gel synthesis approach may be used to produce the nanoparticles as described herein. The ingredients used in a sol-gel reaction as described herein may include one or more of $TiO_2$ precursor, water, an alcohol, marine plant extract, and an ionic liquid containing cations and/or anions.

Suitable $TiO_2$ precursors include, but are not limited to, titanium (IV) butoxide (TBT), titanium tetrachloride, titanium alkoxide, or a titanium compound capable of undergoing hydrolysis and condensation reaction with water such as titanium ethoxide ($Ti(OC_2H_5)_4$) or titanium isopropoxide ($Ti(OCH(CH_3)_2)_4$).

The alcohol used in the sol-gel process includes an alcohol having a carbon number of 1-10; a primary alcohol (1°), a secondary alcohol (2°), or a tertiary alcohol (30), such as ethanol, isopropyl alcohol, or tert-butyl alcohol; or diols or triols, such as ethylene glycol or glycerol.

A marine plant extract, e.g. from algae, corals, sponges, or seaweed, having antifouling properties is included in the sol-gel process. In some embodiments, the marine plant extract is derived from a red algae rhodophyta species such as *Bostrychia tenella* (Ceramiales, Rhodomelaceae). In some embodiments, the marine plant extract is derived from a red sea sponge such as *Carteriospongia foliascens* (Dictyoceratida, Thorectidae). Other suitable marine plants include, but are not limited to, *Corallina mediterranea, Grateloupia filicina, Ulva lactuca, Ulva fasciata* and *Codium tomentosum*, Phaeophyceae; *Colpomenia sinuosa*, Rhodophyceae; *Pterocladia capillacea, Jania rubens*, Mangrove leaves (*Avecinia marina*), and Red Sea cucumbers such as *Holothuria atra* (a), *Holothuria atra* (b) and *Holothuria nobilis* (c).

The extract may be obtained by methods known in the art. For example, the plant material may be dried, then extracted with methanol (one, two, or three or more times). The residue may then be filtered and frozen for later use. Additional filtration may be performed to remove the fatty materials, and the filtrate may then be dried to yield an extract residue.

The ingredients form a colloidal suspension (sol) that is transformed into a gel by aging. In some embodiments, the sol is aged for at least 12 hours, e.g. at least 16, 20, or 24 hours or more.

$TiO_2$ nanoparticles may be formed by drying the gel (e.g. at a high temperature for a period of time) followed by grinding the fel to obtain a powder form of $TiO_2$ nanoparticles. In some embodiments, the nanoparticles are subjected to a calcination step at a high temperature (e.g. at least, 400° C.) for a period of time (e.g. at least 1 hour).

In some embodiments, the nanoparticles are spherical in shape. The nanoparticles described herein may have a diameter of 1-100 nm, e.g. 5-25 nm. In some embodiments, the nanoparticles have a diameter of 5-10 nm, e.g. about 8 nm. In some embodiments, the nanoparticles have a diameter of 20-25 nm, e.g. about 23 nm.

The nanoparticles may be incorporated into antifouling paint formulations for application to surfaces submerged in water. Biofouling may be caused by one or more materials present in an aqueous media with complex such as dissolved species, colloidal species, suspended matter, surfactants or surfactant-like chemicals, microbiological entities such as proteins, and the like. Known marine biofouling agents include plants, bacteria, algae and small animals. Through exposure to sea water, organisms, such as barnacles and algae, attach and grow on the underside of ships. Such growths impact the hydrodynamics of the ship, lowering the efficiency of travel through bodies of water.

In some embodiments, the formulation of the disclosure is biofouling-resistant. "Biofouling-resistant" refers to the ability of the formulation, when applied to a surface, to inhibit attachment and accumulation of biofouling agents. In some embodiments, a biofouling-resistant formulation inhibits at least 50% attachment of biofouling agents as compared to a control, e.g. at least 60%, 70%, 80%, 90%, 91%, 92%, 93%, 94%, 95%, 96%, 97%, 98%, 99%, or 100% attachment after at least 50 days of immersion in water, e.g. at least 60, 70, 80, 90, 100, 110 days or more.

Marine paint formulations may include ingredients such as a binder (i.e. an oil, a polymer, resin, medium or vehicle), pigment, extender, and solvent. The volatile solvent imparts fluid properties to the paint base; however, the volatile solvent evaporates easily as the bonding resin solidifies onto the painted surface. Suitable solvents include a volatile solvent such as xylene. The nanoparticles described herein may be present in the paint formulation at a concentration of 0.1-10 wt %, e.g. 0.5-5 wt %, e.g. about 1 wt %. In some embodiments, the formulation does not include copper or copper ions.

The nanoparticles and paint formulations may be applied to any surface on which it is desired to prevent fouling. For example, the nanoparticles may be applied to the exterior of a boat, ship, or other waterborne vessel or watercraft. The nanoparticles may also be applied to docks, cables, piers, buoys, scientific instruments, medical devices, swimming pools, aquariums, and surfaces that are a part of underwater construction and desalination plants.

Figure 10:
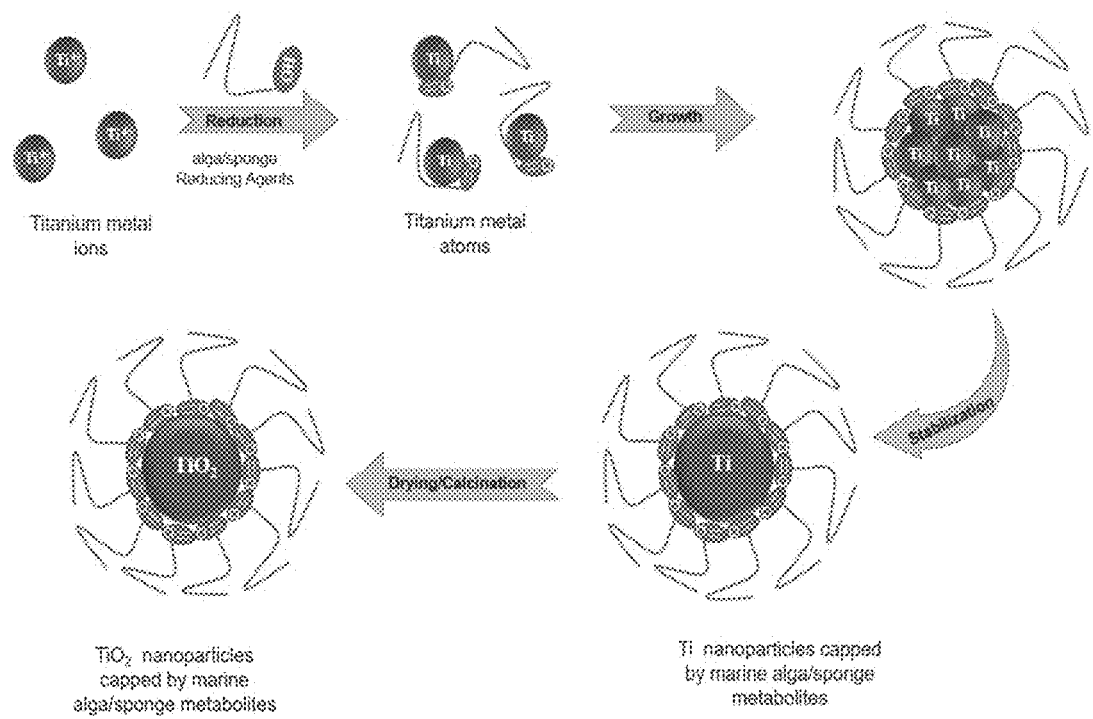
FIG. 10. Schematic diagram for mechanism of the synthesis of $TiO_2$ nanoparticles with marine based materials according to the invention.

Malik et al, 2014, describes a plant-based synthesis of metallic nanoparticles that is accomplished in three consecutive phases: reduction phase, growth phase and stabilization phase. With reference to FIG. 10 and with respect to an embodiment of the invention, the mechanism of marine extract (alga/sponge) mediated synthesis of $TiO_2$ nanoparticles can be discussed in the context of these phases as follows:

(1) Reduction phase involves the reduction of $Ti^{4+}$ ions and the reduced Ti atoms undergo nucleation. This phase is the most important one, wherein the Ti ions ($Ti^{4+}$) are recovered from their salt precursor (Titanium (IV) butoxide) over the interaction of marine extract (alga/sponge) secondary metabolites. These metabolites including alkaloids, flavonoids, polyphenols, and terpenoids can act as chelator to $Ti^{4+}$. Mostly the hydroxyl function ($OH^-$) of the metabolites content develops coordination with metal ions and donates electron for the reduction process. The Ti metal ions are transferred from +4 oxidation state to zero-valent state, then nucleation of the reduced Ti atoms occurs;

(2) Growth phase involves the spontaneous coalescence of small adjacent Ti nanoparticles into larger size nanoparticles, that is, Ostwald ripening (a process in which nanoparticles are directly formed through heterogeneous nucleation and growth and further reduction of metal ion). The aggregation occurred because of stronger binding energy between Ti metal atoms as compared to atom-solvent binding energy. This process enhances the thermodynamic stability of Ti nanoparticles;

(3) Stabilization phase is the final phase in biosynthesis of $TiO_2$ nanoparticles. Nanoparticles acquire the most energetically favorable conformation, with this process being strongly influenced by the ability of the alga/sponge extracts to stabilize metal nanoparticles. Ti nanoparticles eventually get their most intensely favorable and steady morphology when capped through marine alga/sponge metabolites, which prevents further aggregation of metal nanoparticles. After drying and calcination processes, the final $TiO_2$ nanoparticles, capped with the bioactive metabolites, were obtained. The presence of these biologically active capping metabolites have been confirmed by the detection of the surface functional groups like C—C, C—O/C=O and O—C=O, derived from the marine alga/sponge extracts compounds, as illustrated by XPS analysis of both $BTiO_2$ and $CTiO_2$. These capping bioactive compounds are presumed to increase the stability of the nanoparticles as well as enhance their antifouling efficiency.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLE

Summary

Titanium dioxide ($TiO_2$) nanoparticles were synthesized via a novel eco-friendly green chemistry approach using marine natural extracts of *Bostrychia tenella* (Ceramiales, Rhodomelaceae) and *Carteriospongia foliascens* (Dictyoceratida, Thorectidae). The as-prepared nanoparticles were employed as antifouling agents for the fabrication of two different marine paint formulations. The newly prepared formulations were applied on wood panels. A comparative study with commercial antifouling paint was carried out. After 108 days of immersion of the coated panels in seawater of the Eastern Harbour of Alexandria-Egypt, the prepared paints demonstrated an excellent antifouling performance toward fouling organisms by inhibiting the settlement, and preventing the adhesion of fouling organisms onto the immersed panels. Whereas the surface the panel coated with commercial paint showed heavy fouling with barnacles attached to the surface of the panels. The physicochemical parameters of seawater surrounding the immersed coated panels were analyzed to investigate the influence and toxicity of the fabricated paint formulations. No observable effect of the immersed coated panels on physicochemical parameters of the surrounding seawater was found.

Materials and Methods

Extraction of the Red Sea Red Alga *Bostrychia tenella*

The red algal material of *Bostrychia tenella* (Ceramiales, Rhodomelaceae) was collected in September 2018 from the Red Sea, off Rabigh coast, Saudi Arabia (21°29'31" N; 39°11'24" E). Reference standard (JAD 03110) was deposited at the Faculty of Marine Sciences, King Abdulaziz University (Jeddah, Saudi Arabia). The algal material (100.0 g) was air-dried, then extracted with methanol (1000 mL, three times). The residue (2.85 g) was filtered and kept in a deepfreeze at −10° C. for 24 hrs. The extract was filtered again to remove the fatty materials, and the filtrate was then evaporated to dryness to yield a green residue (2.4 g).

Extraction of the Red Sea Sponge *Carteriospongia foliascens*

The fresh sponge material, *Carteriospongia foliascens* (Dictyoceratida, Thorectidae), was collected in September 2018 from the Red Sea, Salman gulf, Jeddah, Saudi Arabia (21° 51'39.8" N; 38° 58'42.7" E). Reference standard (JAD 04090) was deposited at the Faculty of Marine Sciences, King Abdulaziz University (Jeddah, Saudi Arabia). The sponge material (75.0 g) was extracted with methanol (500 mL, three times). The residue (12.1 g) was filtered and kept in a deepfreeze at −10° C. for 24 hrs. The extract was filtered again to remove the fatty materials, and the filtrate was then evaporated to dryness to yield a greenish-brown residue (8.9 g).

Green Synthesis of $TiO_2$

Titanium (IV) butoxide (TBT) was used as a precursor of Ti. 20 mL of TBT was slowly added into an equal volume of absolute ethanol. 2.0 g of each of the marine extracts (*Bostrychia tenella* or *Carteriospongia foliascens*) was dissolved in 25 mL ultrapure Milli-Q water, then added dropwise to titanium solution at 50° C. under vigorous stirring for 2 h, then the formed sol was transformed into gel by aging for 24 h. The desired $TiO_2$ nanoparticles were formed by drying the gel at 100° C. for 12 h, followed by grinding in a crystal mortar pestle to obtain the final powder form of $TiO_2$ nanoparticles and finally, calcination of the nanoparticles in a muffle furnace at 500° C. for 2 h. $TiO_2$ nanoparticles derived from *Bostrychia tenella* and *Carteriospongia foliascens* extracts are denoted as $BTiO_2$ and $CTiO_2$, respectively.

Characterization of $BTiO_2$ and $CTiO_2$

X-ray diffraction (XRD) experiments of the synthesized $TiO_2$ were carried out by using an Ultima IV X-Ray diffractometer (Rigaku) employing $K_\alpha$ radiation operated at 40 kV and 40 mA. The diffractogram was recorded at a scan rate of $4.0°$ $min^{-1}$ over the $2\theta$ range of 20-80 degree. To study the surface morphology and elemental composition of the photocatalysts, Scanning Electron Microscope (SEM, A JSM-7600F, JEOL, USA) with an Energy Dispersive X-Ray Spectroscopic unit (EDS, X-Max 50 $mm^2$, Oxford Instruments). Surface composition of the photocatalysts was analyzed by X-ray photoelectron spectroscopy (XPS, SPECS) operating at a base pressure of $4×10^{-10}$ mbar, using Mg-K$\alpha$ (1253.6 eV) X-ray source at 13.5 kV, 150 W of X-ray power.

Fabrication of Anti-Fouling Coating Paints

Two novel marine paint formulations were prepared by mixing 300 g oil binder material, 100 g iron oxide, 100 g zinc oxide, 100 g PVC, and 100 g complementary pigment in the presence of 300 g of xylene as a solvent by using ball mill until complete mixing was attained. 0.1 g of the synthesized nanoparticles ($BTiO_2$ or $CTiO_2$) was then added into 10 g of the prepared paint under continuous mixing to form the desired antifouling coating formulation. Marine paint formulations derived from $BTiO_2$ and $CTiO_2$ are denoted as BTP and CTP, respectively.

Preparation of Wood Panels

Wood panels with dimensions of 6.7 cm×3 cm×0.5 cm were prepared and their surfaces were tapered using different grades of emery papers till finesse grade. A steel frame with dimension of 100 cm×80 cm was used to hang the wooden panels using nylon thread (FIG. 1).

Paint Application

Two successive brush coatings of each of the two prepared antifouling paints (CTP and BTP) were applied to each wooden panel, allowing sufficient time after each coating to dry. For comparison, a coated panel with commercial marine paint formulation (Sipes Transocean Coatings Optima) was utilized as a blank. An uncoated panel was used as a control. The weight of the paint films on wood panels are shown in Table 1.

TABLE 1

Weight of the paint film on wood panels coated with BTP, CTP, commercial paint (Blank) and unpainted panel (control).

| Panel | weight before painting (g) | weight after painting (g) | weight of paint film (g) | weight of paint film per unit area (g/cm²) |
|---|---|---|---|---|
| BTP | 8.705 | 11.880 | 3.175 | 0.063 |
| CTP | 7.861 | 11.055 | 3.194 | 0.064 |
| Blank | 8.658 | 10.474 | 1.816 | 0.036 |
| Control | 8.771 | — | — | — |

Panel Immersion Test

Figure 2:
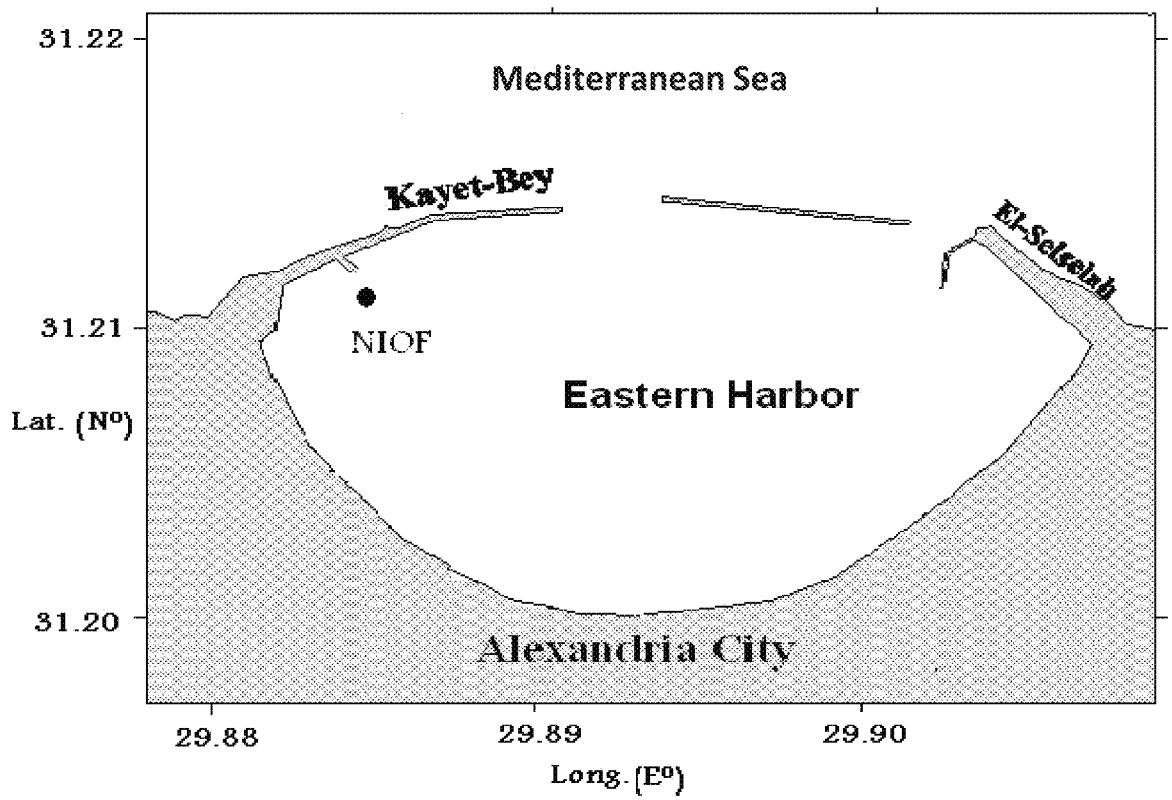
FIG. 2. Location of immersion in the Eastern Harbor of Alexandria, Egypt.

The wood panel immersion test was carried out to study the efficiency of the prepared new formulations as antifoulants. The frame containing the coated panels was directly immersed in the seawater of the Eastern Harbor (EH) of Alexandria-Egypt on 20 May 2020. The map of the immersion location is shown in FIG. 2. After immersion of the frame containing the coated panels in seawater, the surfaces of the panels were followed visually and by photographic inspection for fouling succession over different time intervals. The performance of prepared coatings was evaluated during their exposure time in seawater for 108 days.

Physicochemical Parameters Measurement of Seawater

The physicochemical parameters of seawater on the immersion date and during follow up of the panels were measured. Water temperature was measured using an inductive portable thermometer. Salinity was measured using Salinometer model Beckman RS-10-X3 range to about 0.1 units. Water transparency was measured using Secchi disc. The clearance of water was measured in cm.

The pH-value of water samples was measured to about 0.1 unit in situ by using a portable pH-meter (Orion Research model 210 digital pH-meters) after necessary precautions in sampling and standardization processes. For dissolved oxygen (DO) determination, water samples were collected in 125 ml glass bottles and fixed with 1 ml manganous sulphate followed by 1 ml iodide solution until the analysis in the laboratory. DO was determined according to the classical Winkler's method modified by FAO 1975. The amount of dissolved oxygen in each sample was calculated by applying the following equation (Grasshoff 1976):

$$mlO_2/L = \frac{N \times V \times 32000/4}{4B \times 1.43} \quad (1)$$

N=Normality of sodium thiosulphate,
V=Volume of sodium thiosulphate
B=Volume of oxygen bottle The alkalinity is determined according to standard methods (APHA 1989). The sample (10 ml) was titrated against 0.02 N HCl designated pH value (pH 4.5). Alkalinity is calculated from the following equation:

$$\text{Total alkalinity} = \frac{ml \text{ of } HCl \times 1000 \times N_{HCl}}{ml \text{ of sample}} \quad (2)$$

Oxidizable organic matter (OOM) was determined by permanganate oxidation method (FAO 1975) and calculated from the following equation:

$$mgO_2/L(OOM) = \frac{(V_{blank} - V_{sample}) \times 8 \times 1000 \times N_{Na_2S_2O_3}}{V \text{ of sample}} \quad (3)$$

The most important nutrient salts which are the dissolved inorganic forms of nitrogen ($NO_2^-$, $NO_3^-$ and $NH_3$), phosphate ($PO_4^{3-}$) and silicate ($SiO_3^-$) were determined colourimetrically according to the methods described by Parsons et al. 1984. Their absorbance developed colour was measured by using a double-beam spectrophotometer model Shimadzu UV-150-02 and the values were expressed as μM. Sulphate ($SO_4^{2-}$) was precipitated as barium sulphate and measured turbidimetrically (Bather and Riley 1954).

Results and Discussion

Crystal Phase and Particle Size Analysis

Figure 3A:
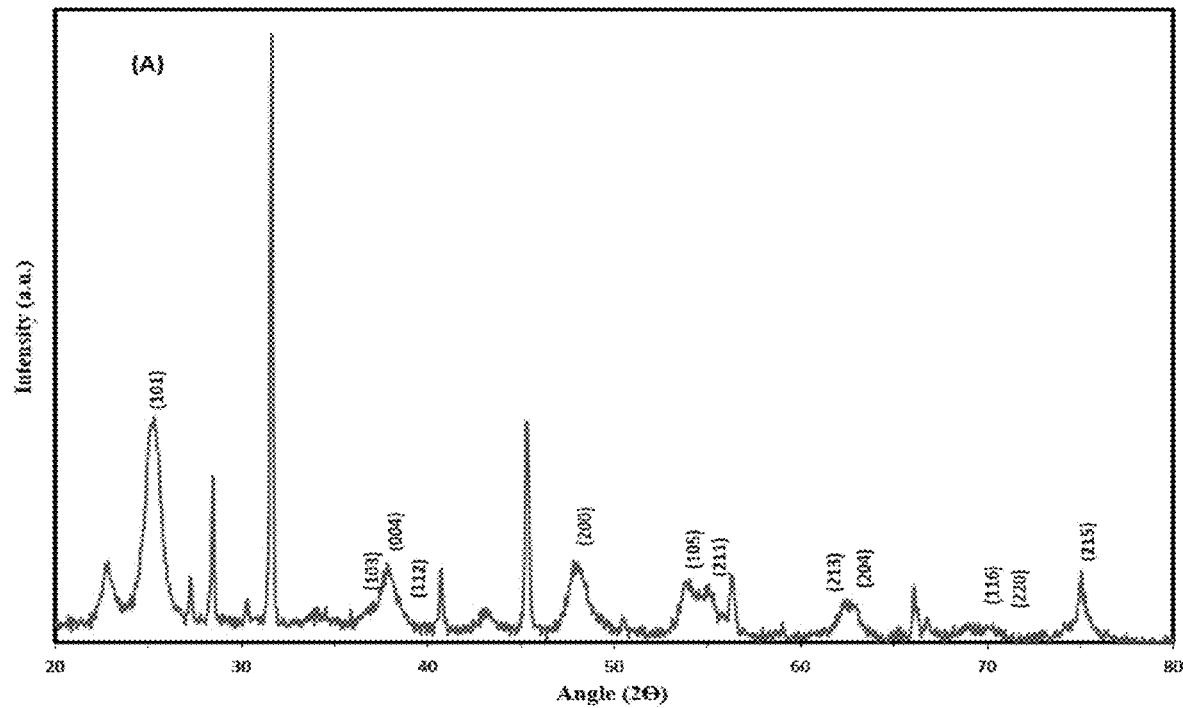
FIGS. 3A-B. XRD patterns for: (A) BTiO$_2$ and (B) CTiO$_2$.
Figure 3B:
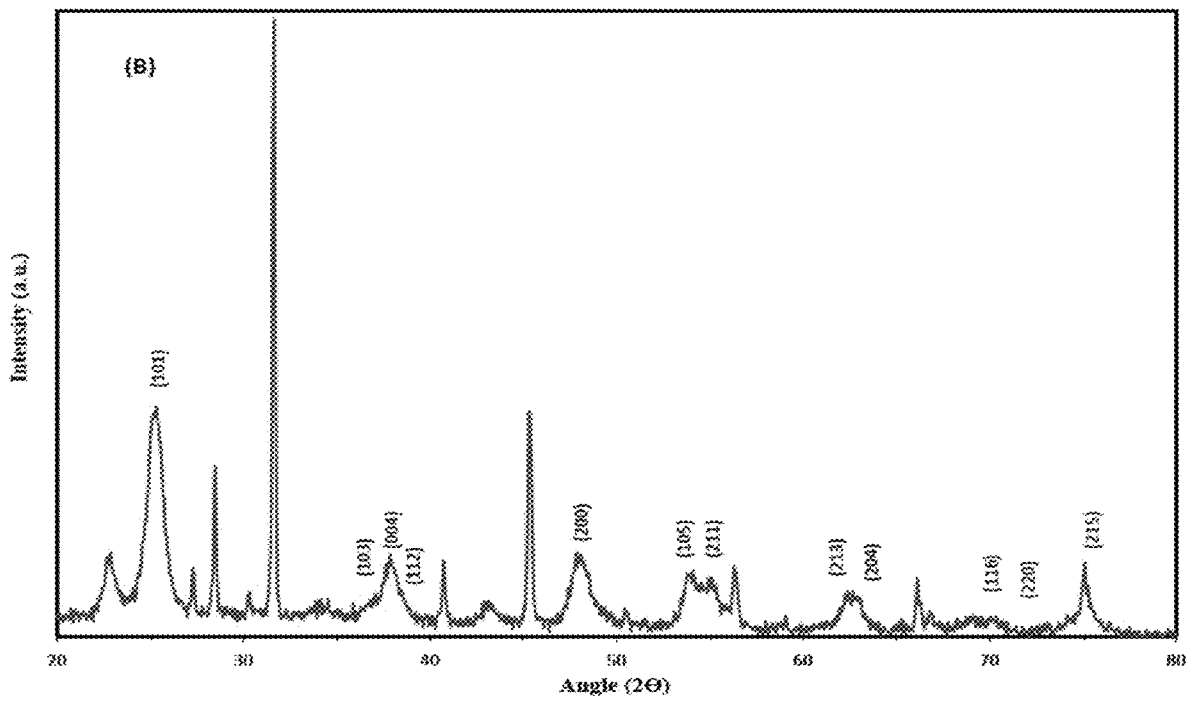

XRD analysis was carried out to determine the crystal phase and the crystallite size of $CTiO_2$ and $BTiO_2$ nanoparticles. As can be seen from FIG. 3, a typical pattern of anatase was indicated for the as-synthesized catalysts by the characteristic diffraction peaks indexed as (101), (103), (004), (112), (200), (105), (211), (213), (204), (116), (220) and (215) for $BTiO_2$ (FIG. 3a) and $CTiO_2$ (FIG. 3b).

Based on the XRD results, the average crystallite sizes of the catalysts were estimated by using Debye-Scherrer's equation:

$$D = k\lambda/(\beta \cos\theta) \quad (4)$$

where D is the average crystallite size in nm, λ is (0.15418 nm) is the wavelength of X-ray radiation, k is the Scherer's constant (k=0.9), 0 is the diffraction angle, and β is a full width at half the maximum (FWHM) of the diffraction line observed. The average crystallite sizes were found to be about 8.3 nm for $CTiO_2$ and 22.86 nm for $BTiO_2$.

Physical properties, such as particle size and crystal form of $TiO_2$ nanoparticles can significantly affect their antifouling activity. It has been reported that the algicidal effect of $TiO_2$ particles increases with decreasing particle size (Ji et al., 2011). The authors also reported that the biocidal activity of anatase nanoparticles was much higher than that of rutile nanoparticles. Furthermore, the charge carrier mobility and separation of anatase is much better than that of rutile, Therefore, the as-synthesized $BTiO_2$ and $CTiO_2$ nanoparticles of the anatase phase with smaller particle sizes may exhibit an enhanced antifouling performance.

Surface Morphology

Figure 4A:
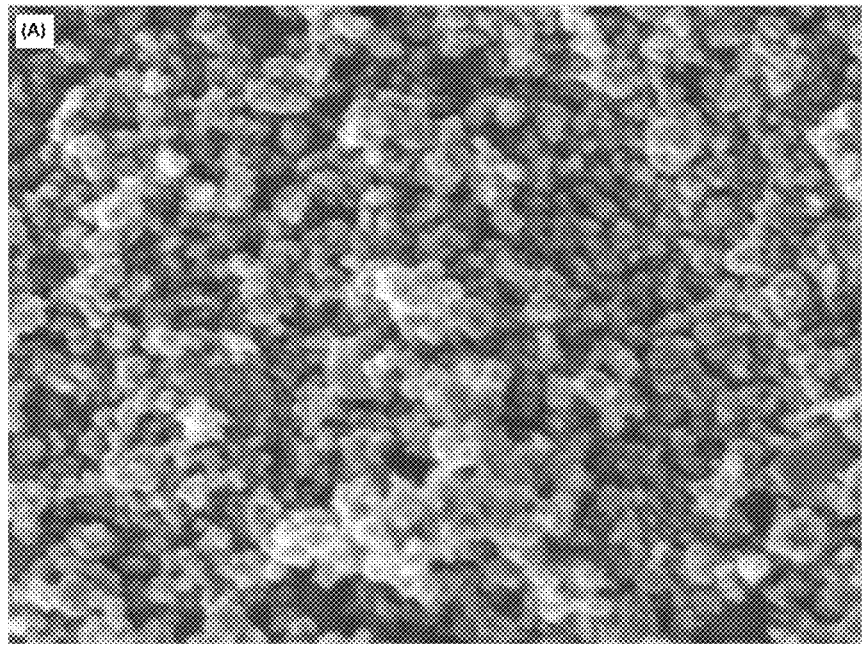
FIGS. 4A-B. SEM images for: (A) BTiO$_2$ and (B) CTiO$_2$.
Figure 4B:
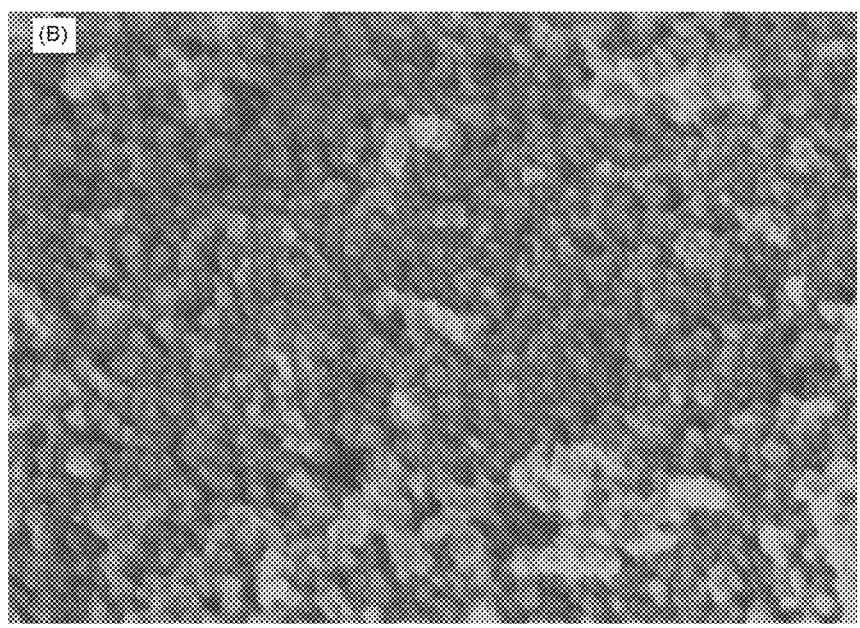

The SEM images were used to examine the surface morphology of the photocatalysts. The SEM images of $CTiO_2$ and $BTiO_2$ nanoparticles are shown in FIG. 4. As clearly evident, uniform monodispersed particle size distribution for the nanoparticles of both samples with smaller crystals for C—$TiO_2$ (FIG. 4b) which is in close agreement with the average crystallite sizes estimated from the XRD patterns.

EDS Analysis

Figure 5A:
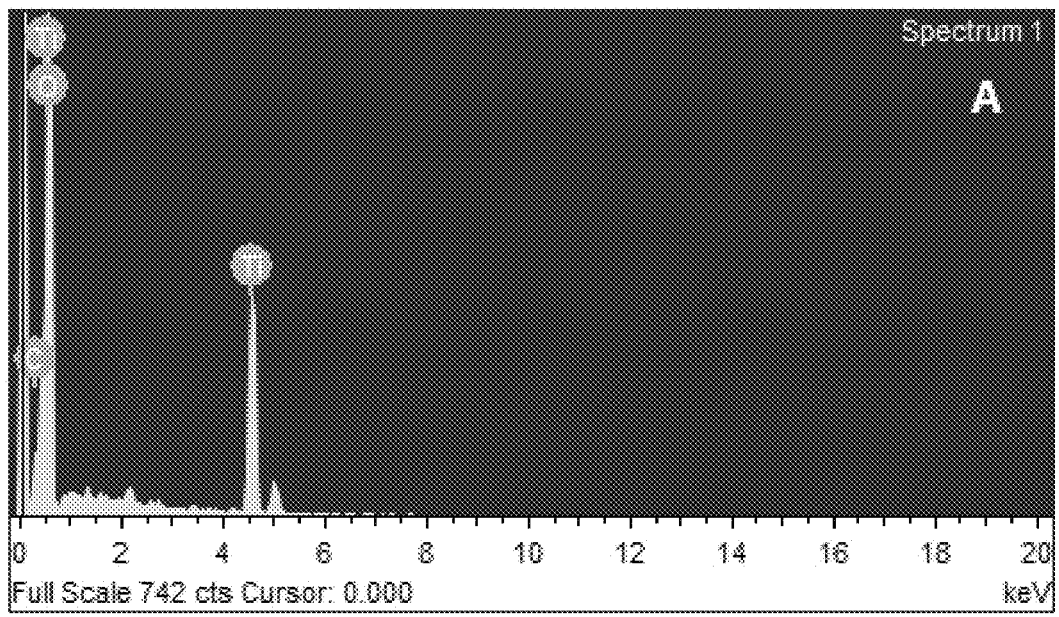
FIGS. 5A-B. EDS analysis for: (A) BTiO$_2$ and (B) CTiO$_2$.
Figure 5B:
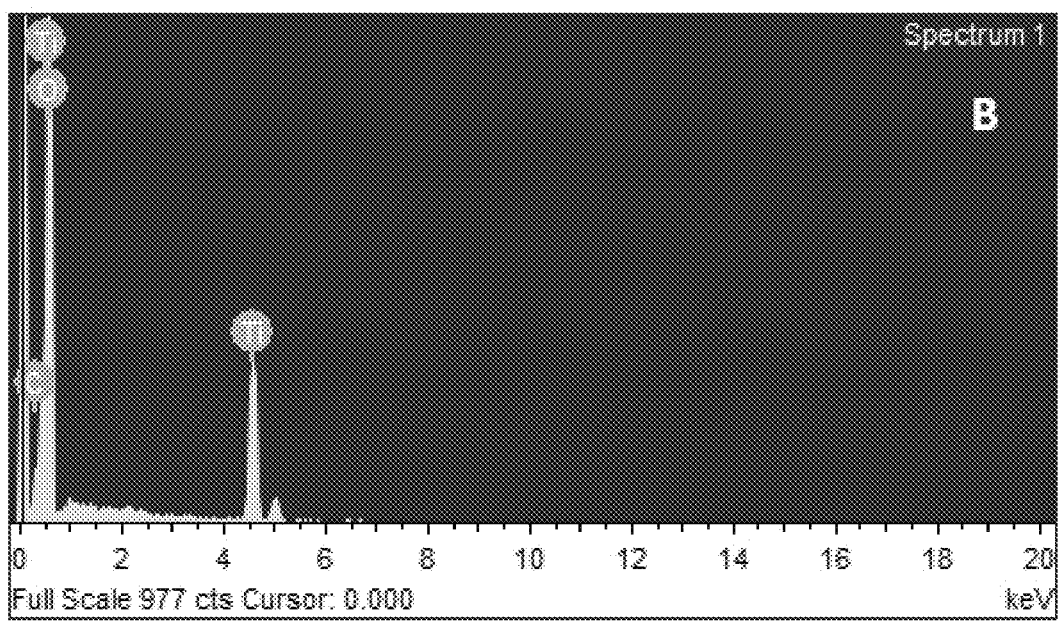

The EDS spectra of the two catalysts are displayed in FIG. 5. Well defined peaks for Ti, O and C elements are shown for both $CTiO_2$ and $BTiO_2$. The elemental composition of the catalysts determined through the EDS analysis is shown in Table 2. The presence of carbon 13.60 atomic % for $BTiO_2$ and 16.91 atomic % for $CTiO_2$ nanoparticles revealing the incorporation of carbon in the lattice of both catalysts during the synthesis process via the addition of natural marine extract containing organic compounds. To incorporate C atoms into $TiO_2$ lattice, three possible scenarios were proposed by Di Valentin et al., (2005). Firstly, substitution of a lattice oxygen with a carbon; secondly, the replacement of Ti atoms by C atoms. Lastly, stabilization of carbon at an interstitial position.

TABLE 2

Optical properties of $CTiO_2$ and $BTiO_2$ nanoparticles.

| Catalyst | Crystal phase | Crystalline size (nm) | EDS (Atomic %) | | | XPS (Atomic %) | | |
|---|---|---|---|---|---|---|---|---|
| | | | Ti | O | C | Ti | O | C |
| $CTiO_2$ | Anatase | 8.3 | 29.82 | 53.27 | 16.91 | 22.9 | 53.4 | 23.7 |
| $BTiO_2$ | Anatase | 22.86 | 33.50 | 52.90 | 13.60 | 19.5 | 66.3 | 14.2 |

The smaller particle sizes of $BTiO_2$ and $CTiO_2$ nanoparticles, estimated from XRD analysis, can be attributed to the incorporation of carbon atoms in both catalysts which suppressed their crystal growth (Kavitha and Devi, 2014), as a result of the replacement of Ti and/or O in the $TiO_2$ lattice by carbon dopant atom (Manoharan and Sankaran, 2018) and the segregation of the doped carbon atoms near the grain boundaries leading to the inhibition of the grain growth $TiO_2$ particles by providing a barrier between them and restricting their direct contact (Lin and Yu, 1998).

XPS Analysis

Figure 6A:
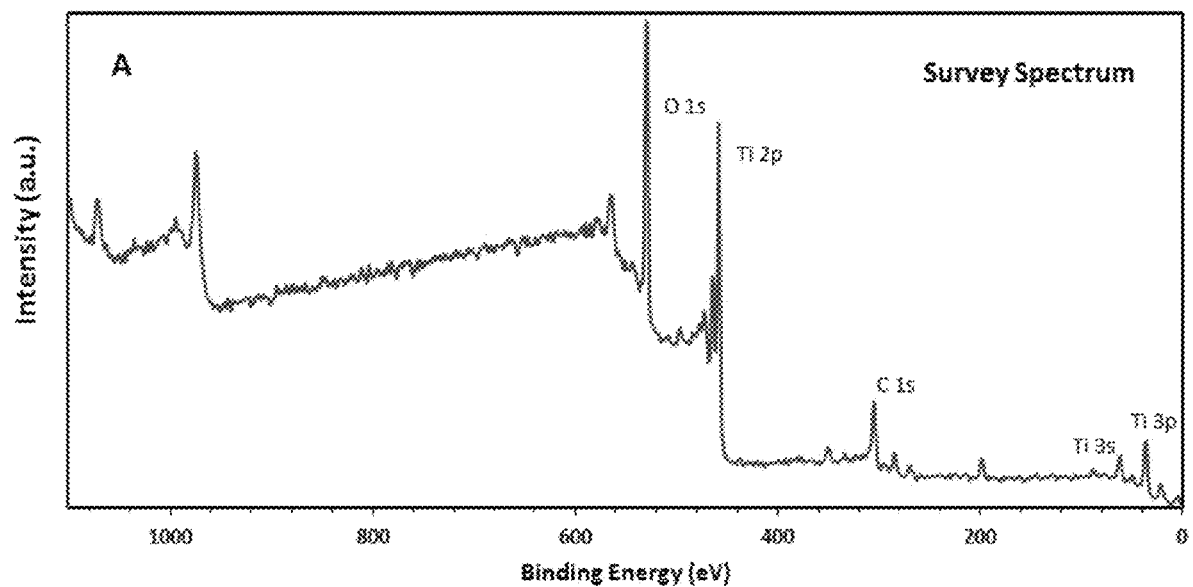
FIGS. 6A-D. X-ray photoelectron spectroscopy (XPS) for (a) survey, (b) Ti 2p, (c) O 1S and (d) C 1S of BTiO$_2$.
Figure 6B:
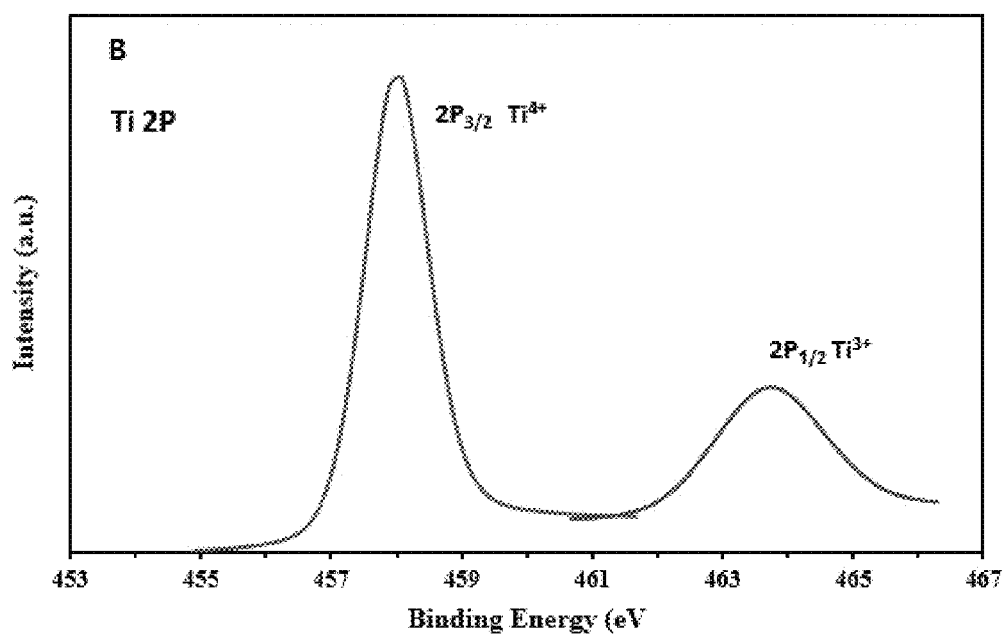
Figure 6C:
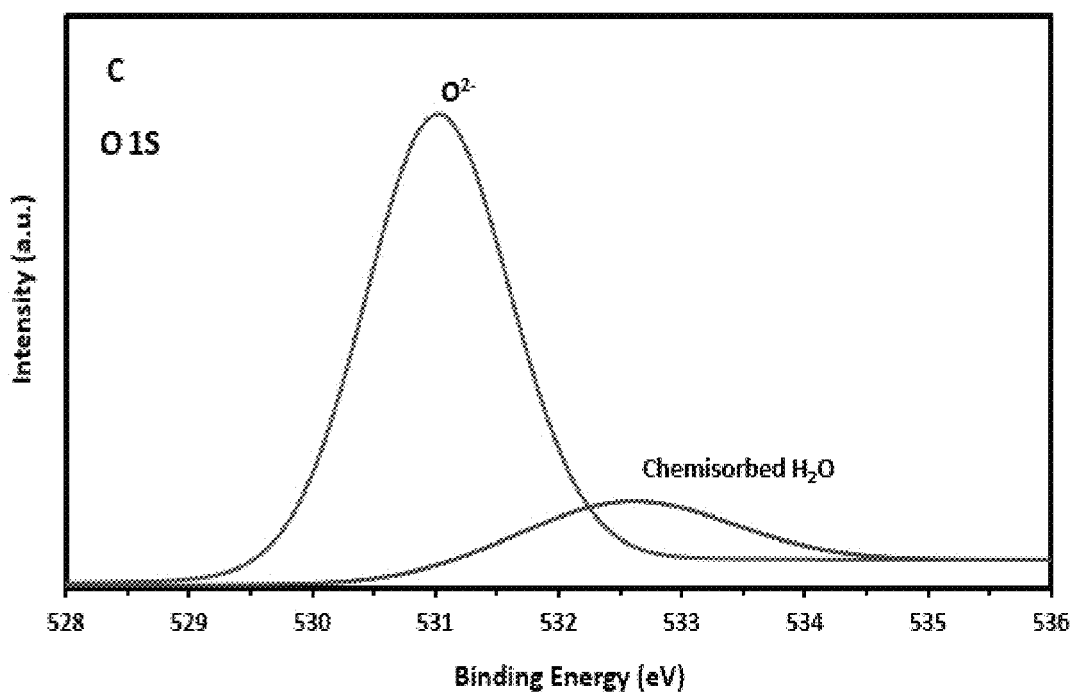
Figure 6D:
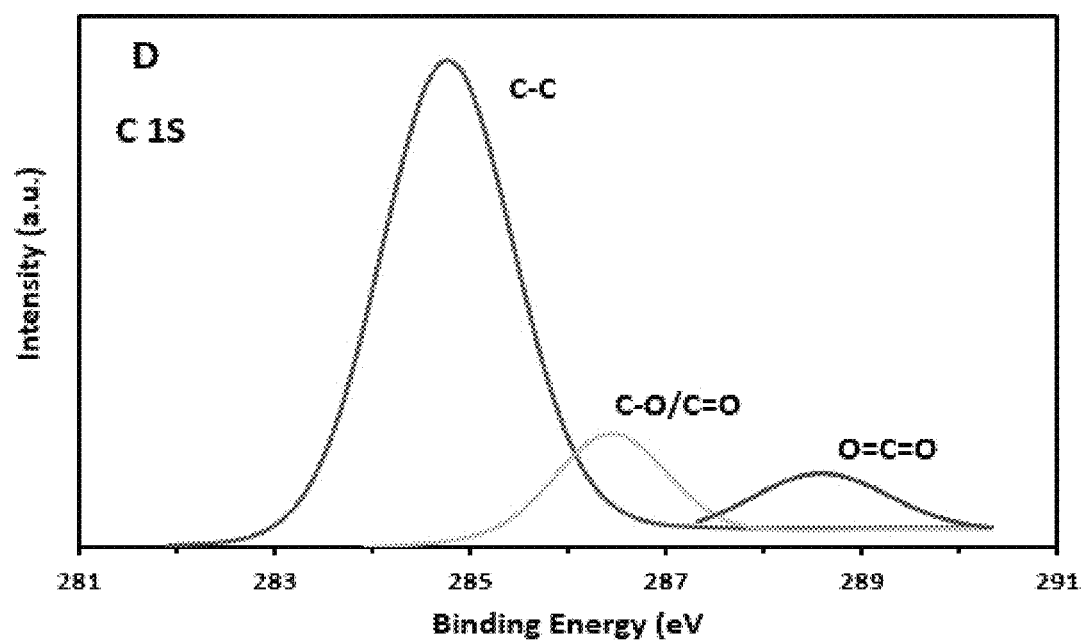

X-ray photoelectron spectroscopy (XPS) was applied to determine the chemical species at the surface of $CTiO_2$ and $CTiO_2$ nanoparticles XPS Analysis for $CTiO_2$ The presence of Ti, O, and C in $CTiO_2$ has been revealed by the XPS survey spectrum (FIG. 6a). The Ti 2p spectrum in FIG. 6b shows two well-resolved spin peaks of Ti $2p_{3/2}$ and Ti $2p_{1/2}$ at 458.01 and 463.7 eV, respectively. The binding energy difference between Ti $2p_{3/2}$ and Ti $2p_{1/2}$ is 5.69 eV which is within the standard reference value of $TiO_2$. The binding energies as well as spin-orbit diverging suggest the existence of Ti as $Ti^{4+}$ (Sakatani et al., 2004; Tao et al., 2012). FIG. 6c shows the 0 is XPS spectrum, which consists of two peaks, the first binding energy peak at 531.03 eV is ascribed to lattice oxygen. The other binding energy peaks at 533.03 eV, is assigned to surface-adsorbed hydroxyl groups of the chemisorbed $H_2O$ or the free hydroxyl group (O—H) on the surface (El-Sheikh et al., 2014; Trevisan et al., 2014; Amaniampong et al 2018; Trinh et al., 2018). The C is XPS spectrum, shown in FIG. 6d, reveals three peaks at 284.91, 286.51 and 288.71 eV, which correspond to the carbon of C—C, C—O/C=O, and O—C=O, respectively (Guo et al., 2011; Etacheri et al., 2013). The XPS results indicate that the atomic composition of $CTiO_2$ was found to be 22.9% Ti 2p, 53.4% O is and 23.7% C is (Table 2).

XPS Analysis for $BTiO_2$

Figure 7A:
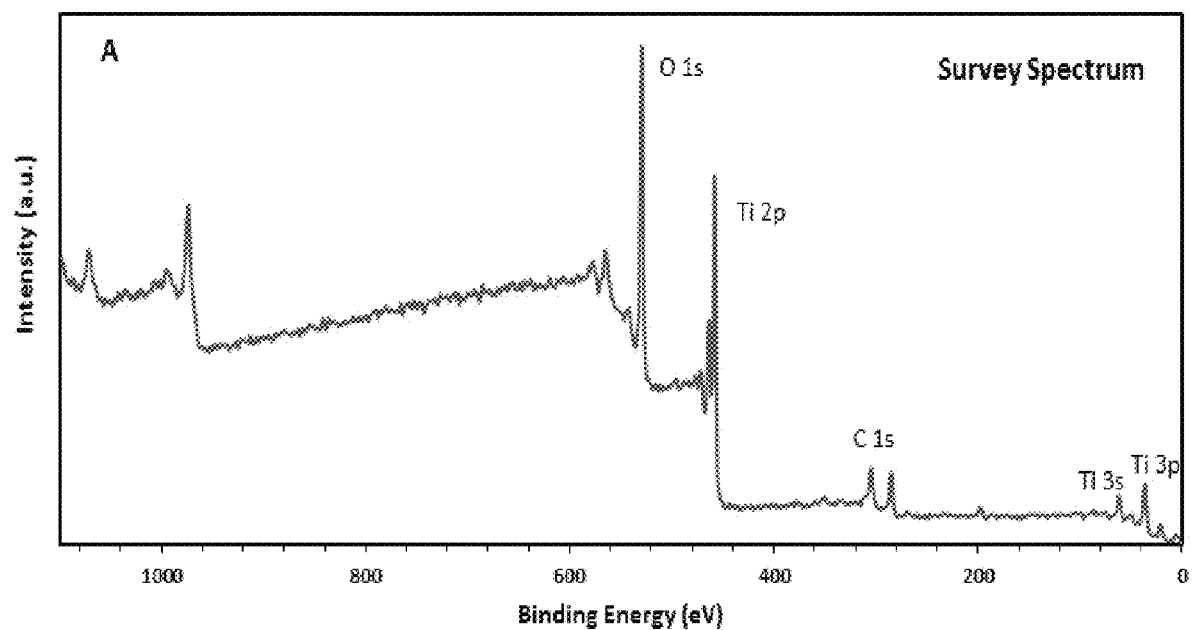
FIGS. 7A-D. X-ray photoelectron spectroscopy (XPS) for (a) survey, (b) Ti 2p, (c) O 1S and (d) C 1S of $CTiO_2$.
Figure 7B:
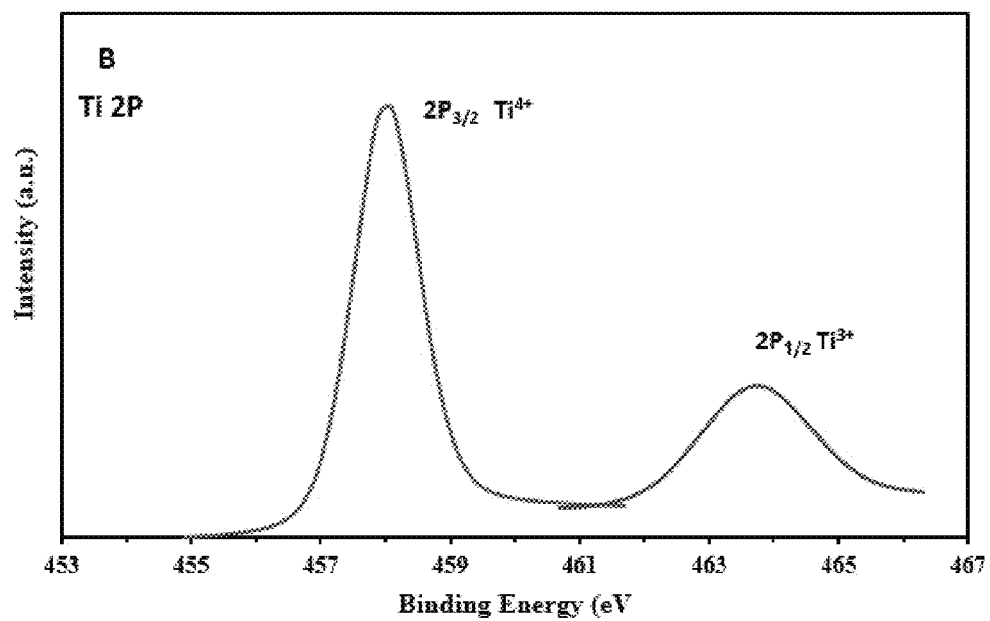
Figure 7C:
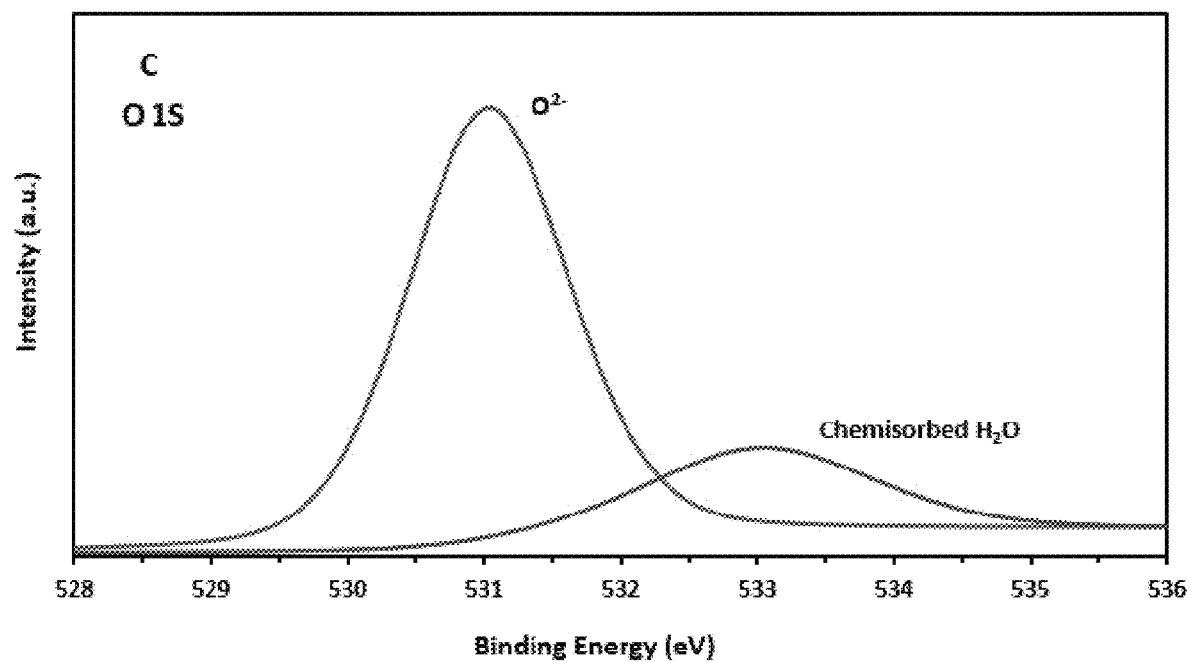
Figure 7D:
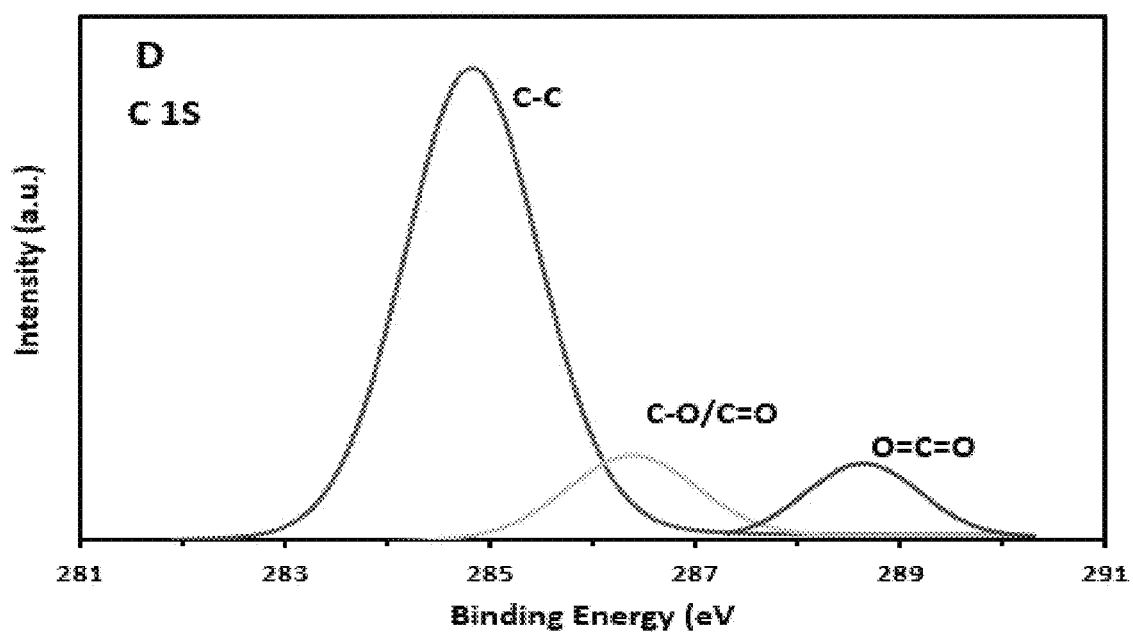

The XPS survey spectrum of $CTiO_2$ shows the presence of Ti, O, and C (FIG. 7a). The Ti 2p spectrum with two spin-orbit components of Ti2p-$2p_{3/2}$ and Ti-$2p_{1/2}$ located at binding energies of 458.00 eV and 463.71 eV, respectively is demonstrated in FIG. 7b. The existence of Ti in the oxidation state of $Ti^{4+}$ is indicated by the 5.71 eV energy separation between Ti2p-$2p_{3/2}$ and Ti-$2p_{1/2}$ (Sakatani et al., 2004; Tao et al., 2012). FIG. 7c displays three peaks for the 0 is. One intense peak at 531.01 eV is attributed to the bulk lattice oxygen (Amaniampong et al 2018; Trinh et al., 2018) bound to Ti (Ti—O, Ti—O—Ti). One less intense peaks with binding energy at 532.58 eV is assigned to the chemisorbed $H_2O$ or the free OH on the surface (El-Sheikh et al., 2014; Trevisan et al., 2014; Amaniampong et al 2018; Trinh et al., 2018). Three peaks centered at 284.77, 286.44 and 288.57 eV are included in the C is XPS spectrum (FIG. 7d), suggesting the existence of carbon as C—C, C—O/C=O and interstitial carbon (O—C=O) in the $TiO_2$ lattice, respectively (Guo et al., 2011; Etacheri et al., 2013). The XPS results indicate that the atomic composition of Ti2p, O1s and C1s for $BTiO_2$ determined by XPS analysis was found to be 19.5% Ti2p, 66.3% O1s and 14.2% C is, respectively (Table 2).

The atomic % of carbon obtained by EDS (14.2% for $BTiO_2$ and 23.7 for $CTiO_2$) is quite different than that obtained by XPS (13.60% for $BTiO_2$ and 16.91% for $CTiO_2$) and can be explained based on the differences between the natures of the incident energies of the two probes, X-ray (for XPS) and electron (for EDS). The XPS gives the chemical composition at the surface region, whereas EDS effectively denotes the concentration of elements present at deeper layers, i.e., near-bulk property (Lei et al., 2015). Accordingly, the obtained results confirmed the carbon incorporation at different depths of the catalyst surface. The doped carbon is distributed on the surface of $CTiO_2$ and $BTiO_2$ as well as occupying interstitial positions in the $TiO_2$ lattice.

Antifouling Performance in Seawater

The antifouling performance of the prepared coatings (BTP and CTP) was evaluated during their exposure time in seawater for 108 days, during the period from 20/5/2020 to 5/8/2020. The photographic inspection of the coated panels was taken from the beginning (Day 0) until the end of immersion period (Day 108). As can be clearly noted from FIG. 8, no fouling organisms have been observed on the surface of the panels coated with CTP and BTP paints after 108 days of immersion in seawater of the Eastern Harbour of Alexandria-Egypt. Both CTP and BTP paints demonstrated an excellent antifouling performance toward fouling organisms in the 108-day sea immersion period. The new paint formulations inhibited the settlement and prevented the adhesion of fouling organisms onto the immersed panels. Whereas, the surface of both blank (coated with commercial paint) and control (unpainted) wood panels showed heavy fouling with barnacles attached to the surface of the panels.

Interestingly, these results were obtained during spring and summer seasons which are considered as the highest accumulation seasons for fouling organisms in Eastern Harbour of Alexandria area (Faragallah et al, 2009).

Several marine creatures defend themselves against biofouling. Surface microstructures and surface wettability were suggested as potential mechanisms against biofouling (Wahl et al., 2012; Dobretsov et al., 2006; Dahms and Dobretsov, 2017). Many secondary metabolites excreted by marine organisms have shown significant power to repel or deter biofouling organisms. In this context, several rhodophyta species (red algae) were extracted and fractionated for isolation of antifouling agents that are safe to the environment and do not kill fouling organisms. Antifouling metabolites isolated from the red algae mainly belong to terpenoids, especially halogenated and nonhalogenated sesquiterpenes, diterpenes, and phenols. Polar extracts (either EtOH or MeOH) displayed better antifouling activity than the corresponding non-polar extracts (n-hexane, methylene chloride,) (Dahms and Dobretsov, 2017). These antifouling extracts displayed potent activity against diatoms, microbes, and algal spore settlement. A literature survey revealed that the genus Bostrychia is a rich source of several polar substances such as amino acids, brominated sulphated phenols, and terpenoids (Orfanoudaki et al., 2020 and 2019; Maciel et al., 2017; de Jesus et al., 2017; de Felicio et al., 2015; Martins et al., 2013; Erbert et al., 2012; de Oliveira et al., 2009). As might be concluded, the antifouling activity of the polar extract of Bostrychia tenella (the red alga under investigation) could be partly attributed to the presence of polar functional groups including amino, hydroxyl, carbonyl, carboxyl, carbon-carbon double bond, carbon-halogen, and hydrogen-bonding functionalities (Prabhakaran et al., 2012).

The second examined marine organism in this Example is the marine sponge Carteriospongia foliascens. Despite the relatively large surface area of this whorled or curved plate-like or cup-like marine creature, it does not suffer from bioaccumulation of the fouling-producing organism on its surface. This antifouling behaviour is attributed to its ability to produce secondary compounds with deterring or repelling power against the fouling organisms. This Red Sea sponge was phytochemically examined for its chemical constituents by many research groups and was found to be a warehouse of sesterterpenoids and nucleic acid precursors (Konig and Wright, 1999; Schmitz and Chang, 1988; Braekman et al., 1985; Fattorusso et al., 1972).

Figure 9A:
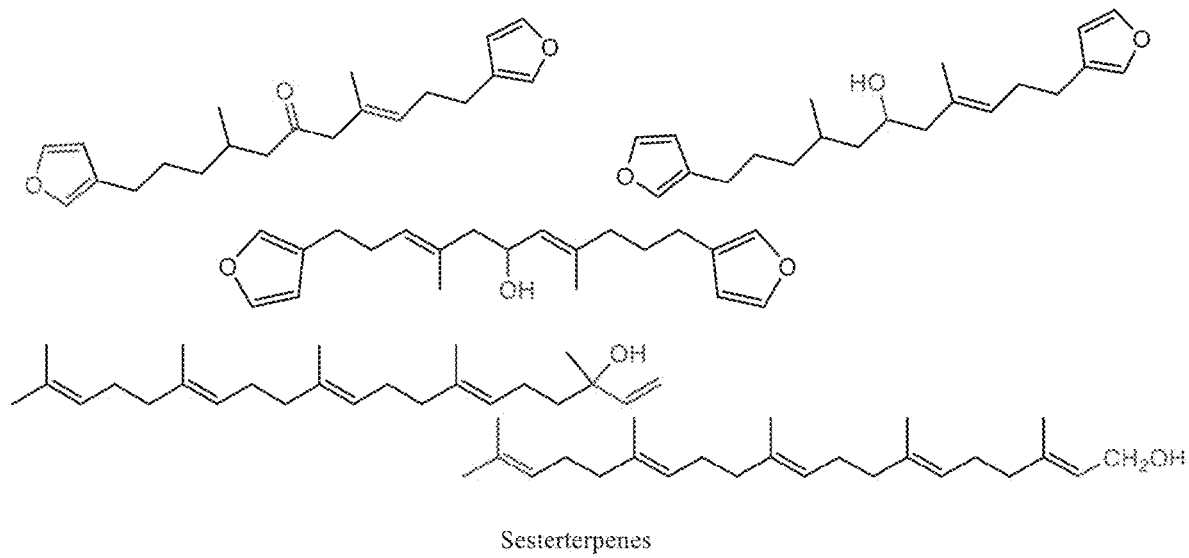
FIG. 9A-B. Secondary metabolites isolated respectively from *Carteriospongia foliascens* (FIG. 9A) and *Bostrychia tenella* (FIG. 9B) with selected active functionalities being highlighted.
Figure 9A:
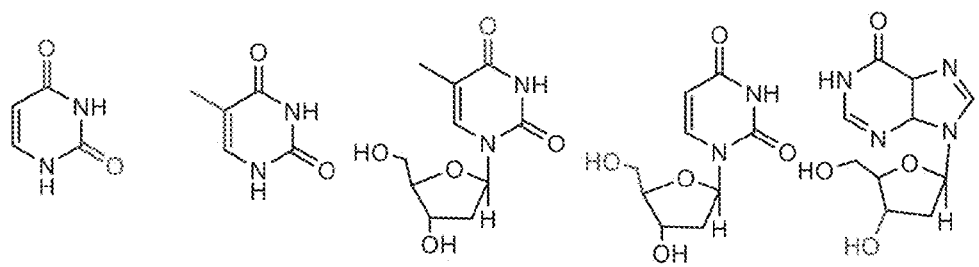
Figure 9B:
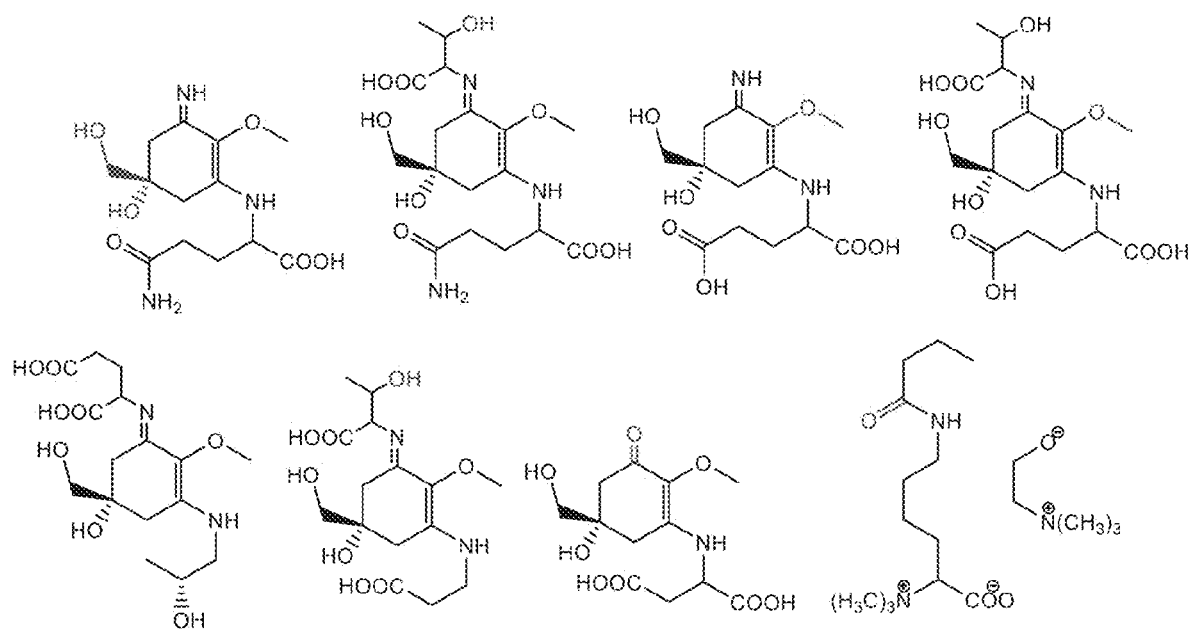
Figure 9B:
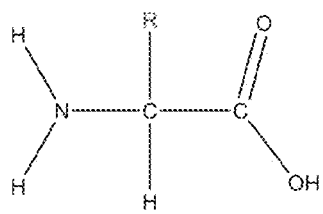

FIG. 9A-B illustrates the presence of several polar functionalities such as N—H, O—H, C—H, H-bonding, etc. Several scientific reports showed that these polar groups enhance the antifouling activity of the organic extract (Dahms and Dobretsov 2017).

The incorporation of carbon into the lattice of both BTP and CTP during the synthesis process has been successfully achieved via the addition of natural organic residue of marine extracts of Bostrychia tenella and Carteriospongia foliascens, respectively, which has been evidenced by EDS and XPS analysis. Secondary metabolites possess anionic radicals such as terpenoids, polyphenols, sugars, alkaloids, phenolic acids, and proteins, play an important role in the bio-reduction of the metal ions, yielding metallic nanoparticles. Examples of the main types of the secondary metabolites of Carteriospongia foliascens and Bostrychia tenella proposed to reduce the metal ions according to the invention are shown in FIGS. 9A-B. The novel combination of nanoparticles including both $TiO_2$ and marine based materials resulted in excellent antifouling properties in an ecologically relevant way.

Physicochemical Parameters of Seawater

The physicochemical parameters of seawater surrounding the immersed coated panels were studied to investigate the influence and toxicity of the fabricated paint formulations. The physicochemical parameters of the EH seawater are presented in Table 3. The seawater temperature of the EH varied between 24.7 and 30.2° C. with a mean of 27.26±1.87° C. The pH ranged between 8.01 and 8.41 showing that it is normal as it is on the alkaline side. Salinity fluctuated between 37.30 and 37.80 PSU/ppt with a mean of 37.65±0.21 PSU/ppt. Transparency was mostly clear as the depth of the Eastern Harbour is 150 cm. The minimum transparency value was 144 cm while the maximum value was 149 cm with a mean value of 147.5±1.87 cm. With respect to the alkalinity it ranged between 3.25 and 3.45 meq/L with a mean of 3.37±0.07 meq/L. Dissolved oxygen (DO) ranged between 3.25 and 4.13 $mlO_2$/L with a mean of 3.74±0.31 $mlO_2$/L indicating low DO concentrations during the studied period which may be due to the eutrophic conditions of Eastern Harbour seawater (Hayat et al. 2009), beside the higher temperature during the summer season. Oxidizable organic matter (OOM) concentrations fluctuated between 1.913 and 2.857 $mgO_2$/L with a mean of 2.481±0.357 $mgO_2$/L. Nitrite ($NO_2^-$) concentrations varied between 0.075 and 1.450 μM with a mean of 0.996±0.486

μM. Nitrates ($NO_3^-$) differed between 13.94 and 15.32 μM with a mean of 14.52±0.455 μM. Ammonia ($NH_3$) concentrations fluctuated between 3.15 and 4.65 μM with a mean of 3.95±0.49 μM. Phosphate ($PO_4^{3-}$) concentrations varied between 2.15 and 3.75 μM with a mean of 3.12±0.55 μM. Silicate ($SiO_3^-$) concentrations fluctuated between 4.75 and 5.65 μM with a mean of 5.22±0.32 μM. Finally, sulphate ($SO_4^{2-}$) concentrations varied between 3.495 and 3.656 g/L with a mean of 3.541±0.075 g/L.

TABLE 3

Physicochemical parameters of the Eastern Harbour seawater from the beginning (Day 0) until the end of immersion period (Day 108).

| Date | Temp. (° C.) | pH | Salinity (PSU/ppt) | Transparency (cm) | Alkalinity (meq/L) | DO (ml $O_2$/L) | OOM (mg $O_2$/L) | $NO_2^-$ | $NO_3^-$ | $NH_3$ (μM) | $PO_4^{3-}$ | $SiO_3^-$ | $SO_4^{2-}$ (g/L) |
|---|---|---|---|---|---|---|---|---|---|---|---|---|---|
| 20 May 2020 | 24.7 | 8.21 | 37.3 | 148 | 3.45 | 3.60 | 1.913 | 1.250 | 14.39 | 3.15 | 3.75 | 5.65 | 3.587 |
| 3 Jun. 2020 | 26.3 | 8.19 | 37.5 | 149 | 3.42 | 3.88 | 2.230 | 0.940 | 13.94 | 3.89 | 3.21 | 5.31 | 3.489 |
| 17 Jun. 2020 | 26.7 | 8.01 | 37.8 | 147 | 3.25 | 3.91 | 2.473 | 1.240 | 14.56 | 4.01 | 3.52 | 5.42 | 3.459 |
| 1 Jul. 2020 | 27.4 | 8.13 | 37.7 | 148 | 3.35 | 4.13 | 2.653 | 1.450 | 14.32 | 3.96 | 3.15 | 5.24 | 3.656 |
| 15 Jul. 2020 | 28.3 | 8.41 | 37.8 | 144 | 3.35 | 3.64 | 2.875 | 1.025 | 14.57 | 4.21 | 2.94 | 4.96 | 3.565 |
| 5 Aug. 2020 | 30.2 | 8.32 | 37.8 | 149 | 3.42 | 3.25 | 2.743 | 0.075 | 15.32 | 4.65 | 2.15 | 4.75 | 3.487 |
| Max | 30.2 | 8.41 | 37.8 | 149 | 3.45 | 4.13 | 2.857 | 1.450 | 15.32 | 4.65 | 3.75 | 5.65 | 3.656 |
| Min. | 24.7 | 8.01 | 37.3 | 144 | 3.25 | 3.25 | 1.913 | 0.075 | 13.94 | 3.15 | 2.15 | 4.75 | 3.495 |
| Average | 27.26 | | 37.65 | 147.5 | 3.37 | 3.74 | 2.481 | 0.996 | 14.52 | 3.98 | 3.12 | 5.22 | 3.541 |
| St dev. | 1.87 | | 0.21 | 1.87 | 0.07 | 0.31 | 0.357 | 0.486 | 0.455 | 0.49 | 0.55 | 0.32 | 0.075 |

As can be seen from the studied physicochemical parameters of the EH seawater, no observable effect of the immersed coated panels on physicochemical parameters of the surrounding seawater was found. Despite the eutrophic condition of the surrounding seawater which accelerates fouling process (Ramadan et al. 2006), the efficient antifouling performance of the new paint formulations (BTP and CTP) was clearly noted.

CONCLUSION

Novel antifouling marine paint formulations have been successfully fabricated by employing titanium dioxide ($TiO_2$) nanoparticles synthesized via a novel eco-friendly green chemistry approach using marine natural extracts of *Bostrychia tenella* (Ceramiales, Rhodomelaceae) and *Carteriospongia foliascens* (Dictyoceratida, Thorectidae). The marine patent formulations were made using a powder of $TiO_2$ nanoparticles capped by marine alga/sponge metabolites, as is shown by example in FIG. 10. Compared to commercial antifouling paint, the prepared paints demonstrated an excellent antifouling performance toward fouling organisms after 108 days of immersion of the coated panels in seawater. Interestingly, no observable effect of the immersed coated panels on the physicochemical parameters of the surrounding seawater was found, revealing the safeness of the new paint formulations.

REFERENCES

Agrios, A. G.; Pichat, P. State of the art and perspectives on materials and applications of photocatalysis over $TiO_2$, J. Appl. Electrochem. 2005, 35, 655-663.

Almeida, E.; Diamantino, T. C.; de Sousa, O. Marine paints: The particular case of antifouling paints. Prog. Org. Coat. 2007, 59, 2-20.

Amaniampong, P. N.; Trinh, Q. T.; Varghese, J. J.; Behling, R.; Valange, S.; Mushrif, S. H.; Jerome, F. Unraveling the mechanism of the oxidation of glycerol to dicarboxylic acids over a sonochemically synthesized copper oxide catalyst, Green Chem. 2018, 20, 2730-2741.

APHA (1989). Standard methods for the examination of water and wastewater by American public Health Association. Broadway, N.Y.

Bather, J. M.; Riley, J. P. The chemistry of the Irish Sea. Part1. The sulphate-chlorinity ratio. J. Cons. Perm. Int. Explor. Mer. 1954, 20 (2), 145-152.

Braekman, J. C.; Daloze, D.; Kaisin, M.; Moussiaux, B. Ichthyotoxicsesterterpenoids from the New Guinean sponge *Carteriospongia foliascens*. Tetrahedron 1985, 41, 4603-4613.

Dahms, H. D.; Dobretsov, S. Antifouling Compounds from Marine Macroalgae. Mar. drugs 2017, 15, 265.

de Felicio, R.; Pavao, G. B.; de Oliveira, A. L. L.; Erbert, C.; Conti, R.; Pupo, M. T.; Furtado, N. A. J. C.; Ferreira, E. G.; Costa-Lotufo, L. V.; Young, M. C. M.; Yokoya, N. S.; Debonsi, H. M. Antibacterial, antifungal and cytotoxic activities exhibited by endophytic fungi from the Brazilian marine red alga *Bostrychia tenella* (Ceramiales). Rev. Braz. Farmacogn. 2015, 25(6), 641-650.

de Jesus, H. C. R.; Jeller, A. H.; Debonsi, H. M.; Alves, P. B.; Porto, A. L. M. Multiple monohydroxylation products from rac-camphor by marine fungus *Botryosphaeria* sp. isolated from marine alga *Bostrychia radicans*. J. Braz. Chem. Soc. 2017, 28(3Spec.Iss.), 498-504.

de Oliveira, A. L. L.; da Silva, D. B.; Turatti, I. C.; Yokoya, N. S.; Debonsi, H. M. Volatile constituents of Brazilian *Bostrychia* species (Rhodomelaceae) from mangrove and rocky shore. Biochem. Syst. Ecol. 2009, 37(6), 761-765.

Devatha, C. P.; Thalla, A. K.; Katte, S. Y. Green synthesis of iron nanoparticles using different leaf extracts for treatment of domestic wastewater, J. Clean. Prod. 2016, 139, 1425-1435.

Di Valentin, C.; Pacchioni, G.; Selloni A. Theory of carbon doping of titanium dioxide, Chem. Mater. 2005, 17, 6656-6665

Dobretsov, S.; Dahms, H. U.; Qian, P. Y. Inhibition of biofouling by marine microorganisms and their metabolites. Biofouling 2006, 22, 43-54.

El-Sheikh, S. M; Zhang, G.; El-Hosainy, H. M.; Ismail, A. A.; O'Shea, K. E.; Falaras, P.; Kontos, A. G.; Dionysiou, D. D. High performance sulfur, nitrogen and carbon doped mesoporous anatase-brookite $TiO_2$ photocatalyst for the removal of microcystin-LR under visible light irradiation. J. Hazard. Mater. 2014, 280, 723-733.

Erbert, C.; Lopes, A. A.; Yokoya, N. S.; Furtado, N. A. J. C.; Conti, R.; Pupo, M. T.; Lopes, J. L. C.; Debonsi, H. M.

Antibacterial compound from the endophytic fungus *Phomopsis iongicolla* isolated from the tropical red seaweed *Bostrychia radicans*. Botanica Marina 2012, 55(4), 435-440.

Etacheri, V.; Michlits, G.; Seery, M. K., Hinder, S. J.; Pillai, S. C. A highly efficient $TiO_{2-x}C_x$ nano-heterojunction photocatalyst for visible-light induced antibacterial applications. ACS Appl. Mater. Interfaces 2013, 5 (5), 1663-1672

FAO. Permanganate value of organic matter in natural waters. Fisheries Technical paper 1975, 137, 169-171.

Faragallah, H. M.; Tadros, H. R. Z.; Okbah, M. A. Nutrient salts and chlorophyll-a during short term scale in the Eastern Harbor, Alexandria (Egypt). Egypt. J. Aquat. Res. 2009, 35(3): 243-250.

Fattorusso, E.; Magno, S.; Santacroce, C.; Sica, D. Scalarin, a new pentacyclic C-25 terpenoid from the sponge *Cacospongia scalaris*. Tetrahedron 1972, 28, 5993-5997.

Grasshoff, K. (1976). Methods of seawater analysis. Verlage Chemie Weinkeim, New York.

Guo, X.; Mao, D.; Lu, G.; Wang, S.; Wu, G. The influence of La doping on the catalytic behavior of $Cu/ZrO_2$ for methanol synthesis from $CO_2$ hydrogenation. J. Mol. Catal. A-Chem. 2011, 345 (1-2), 60-68.

Hamdona, S. Kh.; Abo-Taleb, A. E. A.; Salem, D. M. S. A.; Tadros, H. R. Z. Fouling Control by New Egyptian Natural Sources in Marine Aquaculture. JCBPS. Section D 2018-2019, 9(1), 092-105.

Ibrahim, A. E. M. M.; Moawad, M. N.; Attia, A. M.; El-Naggar, M. A. A.; Tadros, H. R. Z. T. Production of antifouling paints' using environmentally safe algal extracts on laboratory scale. Egypt. J. Aquat. Biol. Fish. 2019, 23 (3), 171-184.

Ji, J.; Long, Z.; Lin, D. Toxicity of oxide nanoparticles to the green algae *Chlorella* sp. Chem. Eng. J. 2011, 170, 525-530.

Kavitha, R.; Devi, L. G. Synergistic effect between carbon dopant in titania lattice and surface carbonaceous species for enhancing the visible light photocatalysis, Journal of Environ. Chem. Eng. 2014, 2, 857-867.

Konig, G. M.; Wright, A. D. Hydrophilic metabolites from the tropical marine sponge *Carteriospongia* sp. Planta Med. 1999, 65, 679-680.

Kordas, G. Nanotechnology to improve the biofouling and corrosion performance of marine paints: from lab experiments to real tests in sea. Int. J. Phys. Res. Appl. 2019, 2, 033-03.

Lei, X. F.; Xue, X. X.; Yang, H.; Chen, C.; Li, X.; Niu, M. C., Gao, X. Y.; Yang, Y. T. Effect of calcination temperature on the structure and visible-light photocatalytic activities of (N, S and C) co-doped TiO2 nano-materials. Appl. Surf. Sci. 2015, 332, 172-180.

Lin, J.; Yu, J. C. An investigation on photocatalytic activities of mixed $TiO_2$-rare earth oxides for the oxidation of acetone in air, J. Photochem. Photobiol. A 1998, 116, 63-67.

Maciel, O. M. C.; Tavares, R. S. N.; Caluz, D. R. E.; Gaspar, L. R.; Debonsi, H. M. Photoprotective potential of metabolites isolated from algae-associated fungi *Annulohypoxylon stygium*. JPPBEG. (2018), 178, 316-322.

Malik, P.; Shankar, R.; Malik, V.; Sharma, N.; Mukherjee, T. K. Green chemistry based benign routes for nanoparticle synthesis. *J Nanopart* 2014, 2014, 1-14

Manoharan, R. K.; Sankaran, S. Photocatalytic degradation of organic pollutant aldicarb by non-metal-doped nanotitania: synthesis and characterization, Environ. Sci. Pollut. Res. 2018, 25, 20510-20517.

Martins, C. D. L.; Ramlov, F.; Carneiro, N. P. N.; Gestinari, L. M.; dos Santos, B. F.; Bento, L. M.; Lhullier, C.; Gouvea, L.; Bastos, E.; Horta, P. A.; Soares, A. R. Antioxidant properties and total phenolic contents of some tropical seaweeds of the Brazilian coast. J. Appl. Phycol. 2013, 25(4), 1179-1187.

Mayer-Pinto, M.; Viana, M. S.; Lavrado, H. P.; Silva, S. H. G. Epibiosis on barnacles at Angra dos Reis, RJ: Eutrophication effects. Nauplius 2000, 8 (1), 55-61.

Orfanoudaki, M.; Hartmann, A.; Miladinovic, H.; Ngoc, H. N.; Karsten, U.; Ganzera, M. Bostrychines A-F, six novel mycosporine-like amino-acids and a novel betaine from the red alga *Bostrychia scorpioides*. Mar. Drugs 2019, 17(6), 356.

Orfanoudaki, M.; Hartmann, A.; Ngoc, H. N.; Gelbrich, T.; West, J.; Karsten, U.; Ganzera, M. Mycosporine-like amino acids, brominated and sulphated phenols: Suitable chemotaxonomic markers for the reassessment of classification of *Bostrychia calliptera* (Ceramiales, Rhodophyta). Phytochem. 2020, 174, 112344.

Parsons, T. R.; Maita, Y.; Lalli, C. M. A manual of Chemical and Biological Methods for Seawater Analysis. Fish, Res. Bd. Canada Bull. 1984, 311p.

Prabhakaran, S.; Rajaram, R.; Balasubramanian, V.; Mathivanan, K. Antifouling potentials of extracts from seaweeds, seagrasses and mangroves against primary biofilm forming bacteria. Asian Pac. J. Trop. Biomed. 2012, 2, 316-322.

Ramadan, Sh. E.; Kheirallah, A. M.; Abdel-Salam, Kh. M. Marine fouling community in the Eastern harbour of Alexandria, Egypt compared with four decades of previous studies. Mediterr. Mar. Sci. 2006, 7 (2), 19-29.

Roethle, P. A.; Trauner, D. The chemistry of marine furanocembranoids, pseudopteranes, gersolanes, and related natural products. Nat. Prod. Rep. 2008 25, 298-317.

Sakatani, Y.; Ando, H.; Okusako, K.; Koike, H.; Nunoshige, J.; Takata, T.; Kondo, J. N.; Hara M.; Domen, K. Metal ion and N co-doped $TiO_2$ as a visible-light photocatalyst. J. Mater. Res. 2004, 19, 2100-2108.

Schmitz, F. J.; Chang, J. C. Sesterterpenes from a Pacific sponge, *Carteriospongia flabellifera*. J. Nat. Prod. 1988, 51, 745-8.

Shaban, Y. A. Solar light-induced photodegradation of chrysene in seawater in the presence of carbon-modified n-$TiO_2$ nanoparticles. Arab. J. Chem. 2019 12, 652-663.

Shaban, Y. A.; Fallata, H. M. Sunlight-induced photocatalytic degradation of acetaminophen over efficient carbon doped $TiO_2$ ($CTiO_2$) nanoparticles. Res. Chem. Intermed. 2019, 45, 2529-2547.

Shaban, Y. A.; Orif, M. I. Purification of seawater by C—Cu—$TiO_2$ ceramic based membrane. Desalin. Water Treat. 2019, 162, 60-69.

Soliman, Y. A.; Ibrahim, A. M.; Tadros, H. R.; Abou-Taleb, A. E.; Moustafa, A. H.; Hamed M. A. Antifouling and antibacterial activities of marine bioactive compounds extracted from some Red Sea cucumber. Int. J. Contemp. Appl. Sci. 2016, 3(9), 83-103.

Sundrarajan, M.; Gowri, S. Green Synthesis of Titanium Dioxide Nanoparticles by *Nyctanthes arbor-tristis* leaves extract. Chalcogenide Lett. 2011, 8 (8), 447-451.

Tadros, A. B.; Tadros, H. R. Z. Studies on tubeworms and sepia shell containing paints using steel surface. Global Climate Change, Biodiversity and Sustainability: Challenges and Opportunities International Conference 2013, 15 p.

Tao, Y. G.; Xu, Y. Q.; Pan, J.; Gu, H.; Qin, C. Y.; Zhou, P. Glycine assisted synthesis of flower-like $TiO_2$ hierarchical spheres and its application in photocatalysis. Mater. Sci. Eng. 2012, 177, 1664-1671.

Trevisan, V.; Olivo, A.; Pinna, F.; Signoretto, M.; Vindigni, F.; Cerrato, G.; Bianchi, C. L. $CN/TiO_2$ photocatalysts: effect of co-doping on the catalytic performance under visible light. Appl. Catal. B: Environ. 2014, 160, 152-160.

Trinh, Q. T.; Bhola, K.; Amaniampong, P. N.; Jerome, F.; Mushrif, S. H. Synergistic Application of XPS and DFT to Investigate Metal Oxide Surface Catalysis. J. Phys. Chem. C. 2018, 122, 22397-22406.

Wahl, M.; Goecke, F.; Labes, A.; Dobretsov, S.; Weinberger, F. The second skin: Ecological role of epibiotic biofilms on marine organisms. Front. Microbiol. 2012, 292.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A method of synthesizing nanoparticles comprising $TiO_2$ and marine-based materials, comprising:
    mixing a solution containing a titanium precursor with a marine plant extract to form a colloidal suspension;
    aging the colloidal suspension to form a gel;
    drying the gel; and
    grinding the gel to obtain a powder comprising the nanoparticles comprising $TiO_2$ and marine-based materials.

2. The method of claim 1, wherein the titanium precursor is titanium (IV) butoxide.

3. The method of claim 1, wherein the marine plant extract is obtained from a red algae.

4. The method of claim 3, wherein the marine plant extract is obtained from *Bostrychia tenella*.

5. The method of claim 1, wherein the marine plant extract is obtained from a red sea sponge.

6. The method of claim 5, wherein the marine plant extract is obtained from *Carteriospongia foliascens*.

7. The method of claim 1, wherein the solution comprises ethanol.

8. The method of claim 1, further comprising a step of calcinating the nanoparticles comprising $TiO_2$ and marine-based materials.

9. A paint formulation, comprising:
    nanoparticles comprising $TiO_2$ and marine-based materials, made by a process comprising
        mixing a solution containing a titanium precursor with a marine plant extract to form a colloidal suspension;
        aging the colloidal suspension to form a gel;
        drying the gel; and
        grinding the gel to obtain a powder comprising the nanoparticles comprising $TiO_2$ and marine-based materials; and
    a volatile solvent.

10. The paint formulation of claim 9, wherein the volatile solvent is xylene.

11. A method of protecting a surface from fouling agents, comprising contacting the surface with nanoparticles comprising $TiO_2$ and marine-based materials made by a process comprising
    mixing a solution containing a titanium precursor with a marine plant extract to form a colloidal suspension;
    aging the colloidal suspension to form a gel;
    drying the gel; and
    grinding the gel to obtain a powder comprising the nanoparticles comprising $TiO_2$ and marine-based materials.

12. The method of claim 11, wherein the nanoparticles comprising $TiO_2$ and marine-based materials are suspended in a volatile solvent as a paint formulation.

13. The method of claim 11, wherein the surface is an exterior surface of a boat, ship, or other waterborne vessel.

* * * * *